July 21, 1931.  C. STICKLEY ET AL  1,815,597
AEROPLANE
Filed April 28, 1930   2 Sheets-Sheet 1
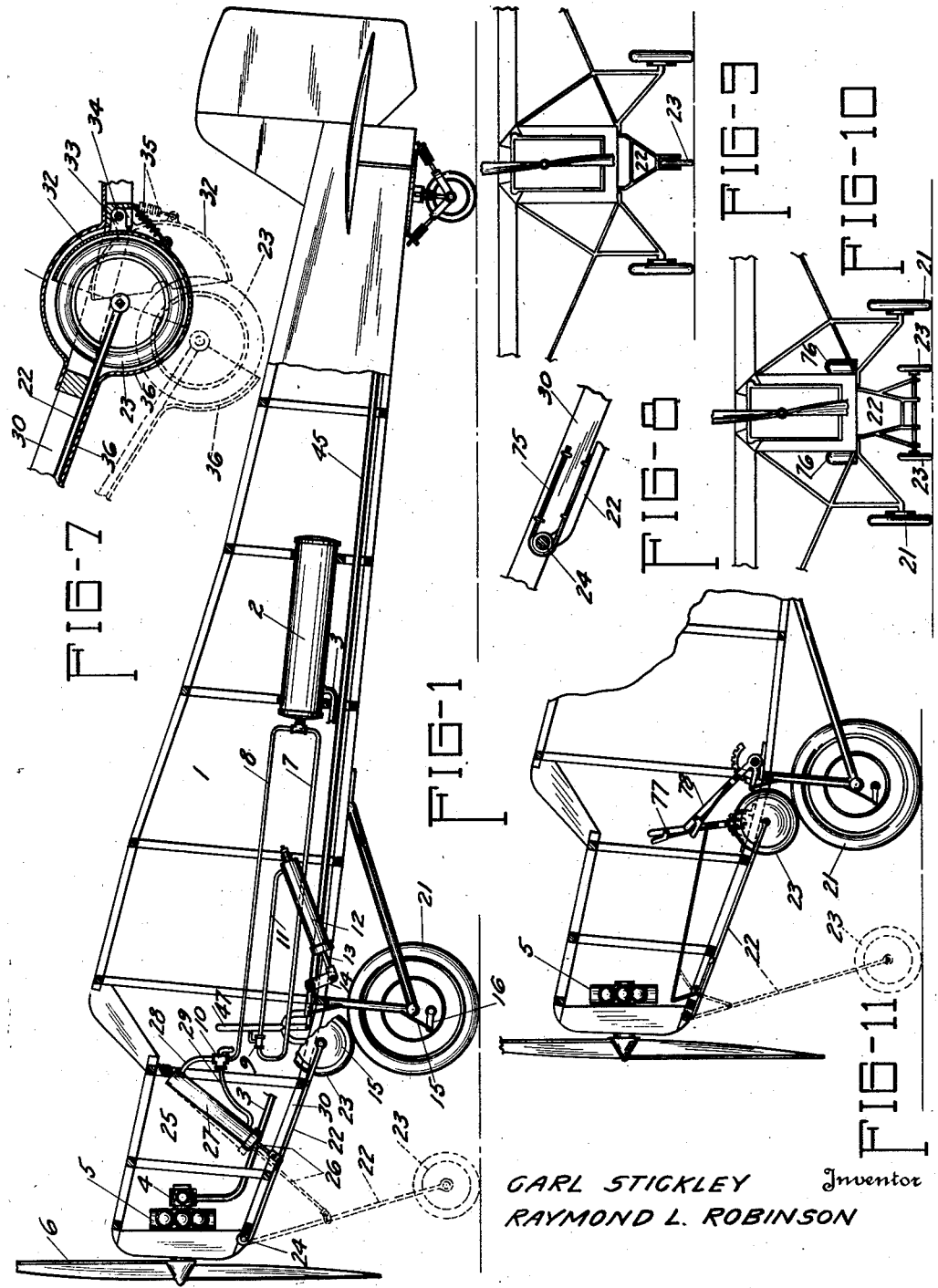
CARL STICKLEY
RAYMOND L. ROBINSON
Inventor
By Merrill M. Blackburn
Attorney

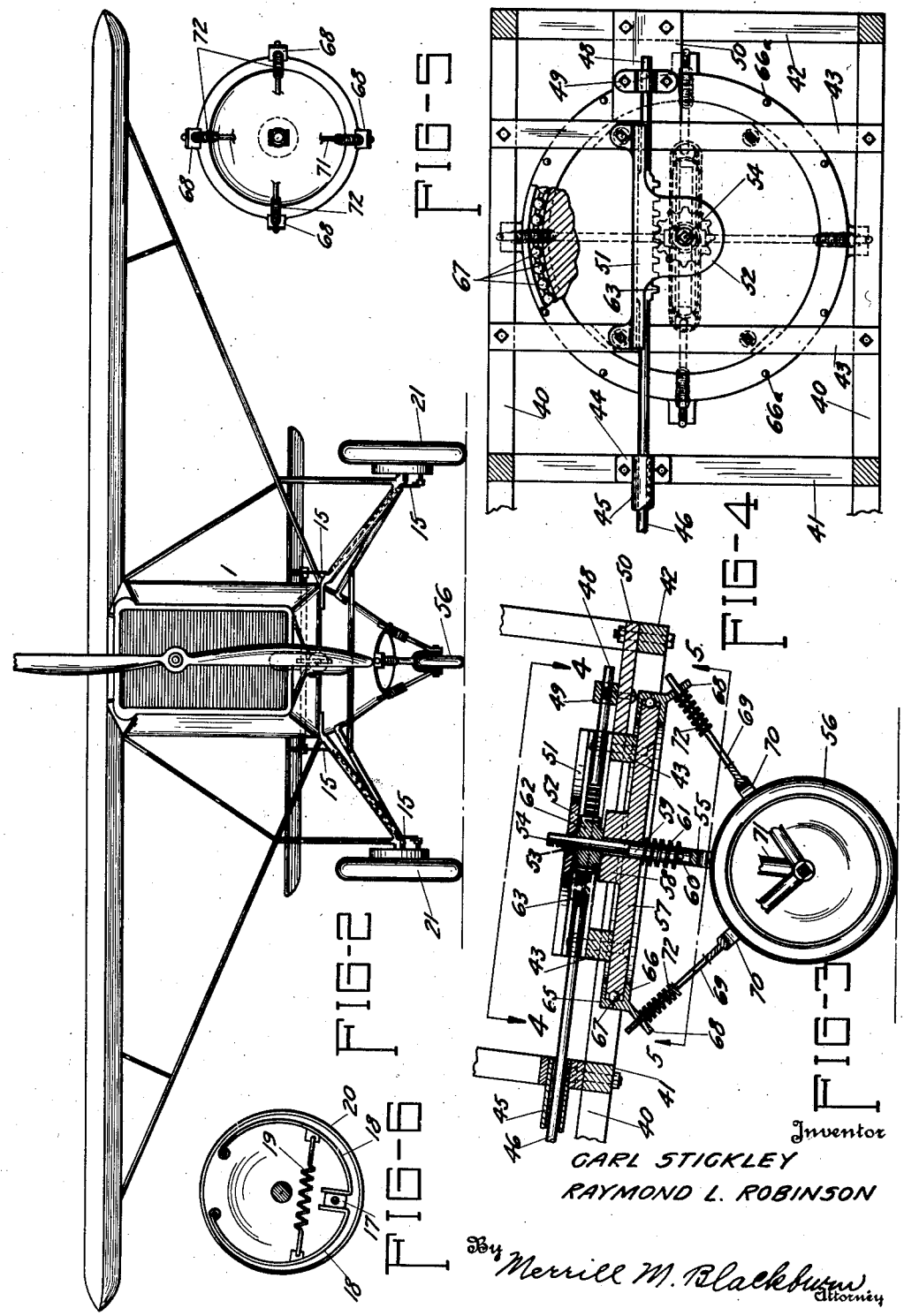

Patented July 21, 1931

1,815,597

UNITED STATES PATENT OFFICE

CARL STICKLEY AND RAYMOND L. ROBINSON, OF DAVENPORT, IOWA

AEROPLANE

Application filed April 28, 1930. Serial No. 448,067.

The present invention relates to certain improvements in aeroplane construction and more especially mechanism for preventing what is referred to as "nosing over" and mechanism for steering the machine from the cockpit while driving the machine around on the ground.

Among the objects of this invention are to provide a machine of the character indicated with air brakes so that the machine may be brought to a more or less quick stop after landing upon the ground; to provide a machine of the character indicated with an air compressor for operating air brakes or for other purposes; to provide an air pressure actuated auxiliary landing mechanism; to so mount a tail-wheel upon the rear portion of an aeroplane that it may be used in steering the aeroplane when traveling on the earth's surface; to provide such a tail-wheel with shock absorbers so mounted and arranged that they will always be in a position to take the shock of landing, regardless of the position of the steering wheel; to provide an aeroplane with a steering, tail supporting wheel and brakes on the front wheels so that the machine may be easily controlled after making a landing and may be guided to desired position after landing and while the propeller is still functioning; to provide an auxiliary landing mechanism adapted to prevent nosing over when landing; to provide means for reducing air resistance to a minimum when an auxiliary landing mechanism is used; to provide an auxiliary landing gear which may have either one or two wheels for engagement with the ground when landing; and such further objects, advantages and capabilities as will hereafter appear and as are inherent in the construction disclosed herein. Our invention further resides in the combination, construction and arrangement of parts illustrated in the accompanying drawings and, while we have shown therein what is now considered the preferred embodiment of our construction, together with certain modifications thereof, we desire this disclosure to be interpreted as illustrative only and not to be construed in a limiting sense.

In the drawings annexed hereto, and forming a part hereof, Fig. 1 is a side elevation of a construction embodying our invention; Fig. 2 is a front elevation of the construction shown in Fig. 1; Fig. 3 is a longitudinal sectional elevation at the rear of the machine to illustrate the construction of the steering wheel; Fig. 4 is a fragmentary plan view looking down upon the structure shown in Fig. 3, as indicated by the line 4—4, in that figure; Fig. 5 is a substantially horizontal section substantially along the plane indicated by the line 5—5, Fig. 3 and looking upwardly; Fig. 6 is a detail of one of the brakes; Fig. 7 is a fragmentary sectional elevation of the front portion of the cockpit showing an auxiliary landing wheel in elevation; Fig. 8 is a detail of a spring and its mounting, said spring being used to hold the auxiliary landing gear up in place; Fig. 9 is a more or less diagrammatic front elevation showing an aeroplane provided with a single wheel contacting with the ground to prevent nosing over; Fig. 10 is a view similar to Fig. 9 but showing the use of a pair of wheels instead of a single wheel; and Fig. 11 is a fragmentary elevation of the front portion of a machine provided with manual means for actuating the auxiliary landing gear and brakes, instead of the air actuated mechanism disclosed in Fig. 1.

Reference will now be made in greater detail to the annexed drawings and it will be seen by reference thereto that the ship is shown more or less diagrammatically in order to reduce the amount of drawing necessary. For this reason, no covering is shown for the framework, except in a portion of Fig. 1, and the aerofoils are shown only in Fig. 2 and diagrammatically in Figs. 9 and 10.

Inasmuch as there is no material change in the machine, so far as air operation is concerned, it is not considered necessary to describe in detail the body 1, the aerofoils, braces, struts, ailerons and rudder, as these are all common structure. Within the body 1 is provided a compressed air tank 2 which is connected by a pipe 3 with a compressor 4 which operates in conjunction with the motor 5 used to drive the propellor 6. From the tank 2 leads a pair of pipes 7 and 8, the former of which goes to a valve 9 and the latter to a two-way valve 10. A pipe 11 extends from the valve 9 to the cylinder 12 in which is mounted a piston for reciprocation under the pressure of the air passing through the pipes 7 and 11. The piston has a piston rod 13 which is connected by means of a crank 14 with a brake actuating cable 15, the latter being connected to the crank 16 by means of which the brake element 17 is actuated. This brake element actuates the brake shoes 18 in a well-known manner, the latter being connected by a spring 19 which tends to normally hold the brake shoes out of contact with the brake drum 20. It will be understood that there is one of these brakes and brake drums in connection with each of the wheels 21. It will be seen from Figs. 1 and 2 that the brakes are applied simultaneously to the two wheels 21, though it will be understood, that if desired, this could be so constructed that the brakes might be independently actuated.

Pivoted at 24, adjacent the forward end of the fuselage 25 is a framework 22 which carries at its lower end a wheel or wheels 23, as shown in Figs. 1, 9, 10 and 11. A piston rod 26, or, if desired, a plurality of such piston rods, are connected to the framework 22 and extended to a cylinder or cylinders 27 to which lead the pipes 28 and 29. These pipes extend from the valve 10 which controls the flow of compressed air from the tank 2. The purpose of the valve 10 is to permit the air flowing through pipe 8 to go to one end or the other of the cylinder 27. This will cause the piston to move either downwardly or upwardly, thus forcing the auxiliary landing gear 22, 23 into the dotted line position shown in Fig. 1 or upwardly into the solid line position shown in this figure. It will be seen from this figure that this auxiliary landing gear serves as a support for the front end of the machine and tends to keep the plane from turning over when the wheels strike the ground and the brakes are applied to stop the machine in a short distance. If it were not for this support under the front end of the machine, the tendency would be for the machine to "nose over" and possibly land on its back. However, with this support under the front end of the fuselage this tendency is overcome and the machine keeps its position right side up.

When the framework 22 is raised into its most elevated position, it lies closely along the under side of the fuselage frame, as represented by the side bar 30 in Fig. 1. Reference will next be made to Fig. 7 for the details of construction of this device. It will be seen from Fig. 1 that the wheel 15 extends upwardly somewhat into the cockpit and from Fig. 7 it is apparent that this wheel is covered by a casing 31 which is mounted on the framework of the aeroplane and keeps operator and passengers from coming into contact with the wheel and its guard. This guard 32 is semi-circular in outline and is provided with a lug 33 which is pivoted at 34, thus permitting the guard to swing upwardly or downwardly with the wheel as the same is raised or lowered. A spring 35 tends to hold the guard 32 downwardly so that it always will be in position to receive the wheel 23 when the latter is raised. Raising of the framework 22 and the wheel 23 causes the guard 32 to be turned upon its pivot 34 into the full line position shown in Fig. 7. The lowered position of this guard is indicated in dotted lines which illustrates the position taken by the guard 32 when the auxiliary landing gear is lowered to the dotted line position in Fig. 1. The framework 22 and the forward side of the wheel 23 are covered by a guard 36 whose edge fits closely against the edge of the guard 32 and thus entirely encloses the wheel 23. In this way a casing smooth upon its outer surface is provided for the wheel and its supporting framework so as to reduce wind resistance to a minimum. It will be apparent from a study of Fig. 1 that the auxiliary landing gear, including the cylinder 27 and the air therein will serve as a cushion when landing the ship. If the wheel or wheels 23 strike the ground first, there will be a tendency to compress the air in the cylinder 27, thus furnishing an air cushion to reduce the jolts when the main running gear 21 strikes the ground. This function is additional to that of preventing nosing over of the machine when the brakes are applied to the wheels 21 when attempting to stop the machine after it strikes the ground.

Reference will now be made to sheet 2 of the drawings for a more particular description of the steering wheel and its mounting and operation. The lower frame members 40 have cross bars 41, 42 and 43 connecting them and on the cross bar 41 is mounted a securing plate 44 by means of which the tube 45 is held in place. Slidably mounted within this tube is a rod 46 whose forward end is connected to the lever 47 located in the cockpit. This lever therefore serves as means for reciprocating the rod 46 whose rearmost end 48 slides through a bracket 49 mounted on the plate 50. This latter is mounted on the cross bar 42. A guard and guide 51 is secured to the cross bars 43 and serves as means to prevent the rod 46 from being bent laterally toward a side of the frame. The guard 51 has a lateral extension 52 which is perforated at 53 for reception of an angular shank 54 on the upper end of the yoke 55 in which the steering wheel 56 of the tail of the machine is mounted. The opening 53 in the projection 52 is large enough so that the shank 54 slides freely therein. The uses of this projection 52 will be presently referred to in more detail.

On the under side of the cross bars 43 is mounted a fixed plate 57, provided centrally with a perforation, which perforation is surrounded by a boss 58. The yoke 55 is provided with a round shank 59 whose upper portion forms the squared shank 54. An abutment, shown in the drawings as a pin 60 extending through the shank, forms a rest for one end of the spring 61 whose opposite end rests against the under side of the fixed plate 57. It will thus be seen that when the wheel 56 strikes the ground the spring 61 will be compressed and the shank 54 will slide upwardly through the opening in the extension 52. Surrounding the squared shank 54 and having slidable connection therewith is a gear 62 whose teeth mesh with a rack 63, either formed on or secured to the rod 46. Therefore, as the rod 46 is reciprocated the rack 63 will cause rotation of the gear 62 and this, in turn, will rotate the shank 54 and, with it, the yoke 55. This will cause lateral turning of the wheel 56 which, as will be readily understood, will cause steering of the machine.

The outer edge of the fixed plate 57 is provided with a groove which forms a ball-race. This edge of the plate is surrounded by a divided ring composed of the sections 65 and 66, secured together by suitable securing means 66a. This ring, with the disk 57, forms a housing for the balls 67, whose function is to reduce the turning friction of the ring. This ring carries a series of ears 68 which are perforated for the reception of the stems 69 of the yokes 70. There are also lateral braces 71 which tend to stay the wheel 56 against lateral stresses. Springs 72 give a cushioning effect to permit the shanks 69 to slide through the ears 68, the spring being compressed and then expanding to restore the parts to their normal positions. It will thus be apparent that there is a five spring cushion for the tail of the machine and that the springs will tend to cushion the wheel against lateral strains in any direction and restore the same to normal position. Of course it will be obvious that no great amount of lateral motion can take place by reason of the fact that the shank 59 fits fairly closely in the plate 57 and the squared portion 54 does not have a great deal of play in the extension 52. However, these lateral stays tend to keep the yoke 55 and shank 59 from getting bent, due to sidewise strains. It will also be apparent that the springs 72 take part in cushioning the upward movement of the wheel 56, relatively to the frame of the machine.

As illustrated in Fig. 8, the frame 22 of the auxiliary landing mechanism is held upwardly closely adjacent the frame members 30 by means of a spring 75 whose arms are secured respectively to the frame 22 and members 30. As previously indicated, the structure illustrated in Fig. 9 is one in which there is but a single wheel 23 for preventing the nosing over, this wheel being raised upwardly into a concavity in the lower side of the cockpit. In the structure shown in Fig. 10, the framework 22 carries a pair of wheels 23 which are raised upwardly into housings 76 along side the cockpit. This construction is particularly useful for landing purposes in event one or both of the main wheels 21 should become detached, either when flying or when making a landing. The two wheels 23 will have a tendency in either event to keep the ship on an even keel, thus preventing it from tipping over laterally and breaking a wing.

The structure shown in Fig. 11 is one in which the air compressor, air tank, and associated parts are dispensed with and the auxiliary landing means is actuated by the lever 77 while the brakes are actuated by means of the lever 78.

It will be apparent from the foregoing description that we have provided a mechanism which will accomplish the objects set forth herein.

It is of course understood that the specific description of structure set forth above may be departed from without departing from the spirit of our invention as set forth in this specification and the appended claims.

Having now described our invention, we claim:

1. An aeroplane having connected to its rear portion a substantially circular member provided with a ball-race, said member being connected in fixed relation with the frame of the aeroplane, balls in the ball-race, a retaining ring in association with said circular member to retain the balls in position in the race, a wheel connected to the ring and adapated to turn therewith about the circular member and means for causing turning of the ring and wheel about an axis substantially perpendicular to the plane of the circular member.

2. A structure as defined in claim 1 provided with resilient means for resiliently supporting the ring and circular member with relation to the wheel.

3. An aeroplane having a motor, an air compressor driven by said motor, a cylinder having a piston therein to be actuated by compressed air, means conveying the compressed air from the compressor to said cylinder, an auxiliary means for the aeroplane pivotally connected to the frame of the aeroplane adjacent the forward end thereof and having means connecting the piston with the auxiliary means so that actuation of the piston by the compressed air will cause the auxiliary means to be turned about its pivot and into a position to engage the earth in event the tail of the machine rises from the ground when making a landing.

4. An aeroplane having landing wheels, provided with brakes and brake actuating mechanism, said brake actuating mechanism including a cylinder and a piston, a source of compressed air, means to convey the compressed air to said cylinder, means connecting the piston with the brakes so that introduction of compressed air from the source thereof into the cylinder will cause actuation of the brakes, said machine having a wheel connected to the forward part of the fuselage, forwardly of the wheel and adapted to be let down to support the forward portion of the aeroplane and prevent nosing over when making a landing.

5. In an aeroplane, a motor driven air compressor, a storage reservoir for the air, auxiliary landing wheels pivotally connected with the front portion of the fuselage, to be extended into ground engaging position or raised into such position that said wheels are partly contained in the fuselage, an air cylinder for turning said auxiliary landing wheels about their pivotal connection with the fuselage substantially into contact with the earth's surface or up against the body of the aeroplane, means connecting the storage reservoir with the air cylinder, and means for directing the compressed air into one end or the other of the air cylinder.

6. An aeroplane having a turn-table in operative association with the rear portion of the machine, a wheel supporting said turntable and rear portion of the machine above the earth's surface, and means for actuating the wheel to cause it to turn on an axis substantially normal to the plane of the turntable, in combination with resilient means for cushioning vertical movements of the aeroplane with relation to said wheel, and means for resiliently bracing the wheel with relation to the aeroplane structure to take care of lateral thrust in any direction.

7. An aeroplane having landing wheels, provided with brakes and auxiliary landing means connected adjacent its front end to prevent nosing over due to applying the brakes when landing, in combination with resilient means tending to normally hold the auxiliary landing means up against the under side of the aeroplane.

In witness whereof, we hereunto subscribe our names to this specification.

CARL STICKLEY.
RAYMOND L. ROBINSON.